(12) United States Patent
Geng et al.

(10) Patent No.: US 12,363,015 B2
(45) Date of Patent: Jul. 15, 2025

(54) CLOCK-SYNCHRONIZED EDGE-BASED NETWORK FUNCTIONS

(71) Applicant: Clockwork Systems, Inc., Palo Alto, CA (US)

(72) Inventors: Yilong Geng, Menlo Park, CA (US); Balaji S. Prabhakar, Palo Alto, CA (US); Shiyu Liu, Mountain View, CA (US)

(73) Assignee: Clockwork Systems, Inc., Palo Alto, CA (US)

( * ) Notice: Subject to any disclaimer, the term of this patent is extended or adjusted under 35 U.S.C. 154(b) by 624 days.

(21) Appl. No.: 17/725,404

(22) Filed: Apr. 20, 2022

(65) Prior Publication Data

US 2022/0345389 A1 Oct. 27, 2022

Related U.S. Application Data

(60) Provisional application No. 63/320,160, filed on Mar. 15, 2022, provisional application No. 63/178,999, filed on Apr. 23, 2021.

(51) Int. Cl.
*H04L 43/0852* (2022.01)
*H04L 43/12* (2022.01)
(Continued)

(52) U.S. Cl.
CPC ...... *H04L 43/0852* (2013.01); *H04L 43/0858* (2013.01); *H04L 43/12* (2013.01); *H04L 47/12* (2013.01); *H04L 47/2433* (2013.01)

(58) Field of Classification Search
CPC . H04L 43/0852; H04L 43/0858; H04L 43/12; H04L 47/12; H04L 47/2433;
(Continued)

(56) References Cited

U.S. PATENT DOCUMENTS 7,139,923 B1 11/2006 Chapman et al.
7,512,980 B2 * 3/2009 Copeland ............ H04L 63/1416
709/227
(Continued)

FOREIGN PATENT DOCUMENTS

JP 2005-260839 A 9/2005
WO WO-2010/089886 A1 8/2010

OTHER PUBLICATIONS

Ndikumana, A. "Novel Cooperative and Fully-Distributed Congestion Control Mechanism for Content Centric Networking," IEEE Access, vol. 5, Nov. 29, 2017, pp. 27691-27706.
(Continued)

*Primary Examiner* — Kwang B Yao
*Assistant Examiner* — Syed M Bokhari
(74) *Attorney, Agent, or Firm* — Fenwick & West LLP

(57) ABSTRACT

Network traffic is monitored to coordinate control of data flows and detect anomalies. For a data flow transmitted between sender and receiver hosts, pre-defined amounts of sent and received network traffic of the data flow is recorded. The data flow is monitored, based on time stamps of data packets in the network traffic, for an anomaly. Responsive to determining that no anomaly is detected, the recorded sent and received network traffic is overwritten with newly sent and newly received network traffic, respectively. Responsive to determining that an anomaly is detected, the data flow is paused, which causes the sender host to store the recorded sent network traffic to a first buffer and causes the receiver host the store the recorded received network traffic to a second buffer.

17 Claims, 8 Drawing Sheets

(51) Int. Cl.
*H04L 47/12* (2022.01)
*H04L 47/2425* (2022.01)

(58) Field of Classification Search
CPC ... H04L 43/0876; H04L 43/106; H04L 67/10; H04L 67/61; H04L 69/40; G06F 1/12; G06F 1/14
USPC .......................................................... 370/252
See application file for complete search history.

(56) References Cited

U.S. PATENT DOCUMENTS

| | | | |
|---|---|---|---|
| 10,623,173 B1 | 4/2020 | Geng et al. | |
| 10,986,029 B2* | 4/2021 | Altman | H04L 47/2483 |
| 11,115,426 B1* | 9/2021 | Pazhyannur | H04L 41/0686 |
| 11,849,016 B1* | 12/2023 | Wang | H04L 43/0858 |
| 2002/0163933 A1 | 11/2002 | Benveniste | |
| 2004/0015582 A1* | 1/2004 | Pruthi | H04L 63/1458 |
| | | | 709/224 |
| 2007/0015525 A1 | 1/2007 | Beming et al. | |
| 2007/0121499 A1 | 5/2007 | Pal et al. | |
| 2007/0237073 A1 | 10/2007 | Jutzi | |
| 2007/0268882 A1 | 11/2007 | Breslau et al. | |
| 2009/0024884 A1 | 1/2009 | Klein | |
| 2015/0058852 A1 | 2/2015 | Easton et al. | |
| 2016/0164765 A1 | 6/2016 | Aybay | |
| 2016/0179746 A1 | 6/2016 | Hein et al. | |
| 2017/0279921 A1* | 9/2017 | Foulkes | H04L 12/4625 |
| 2018/0025135 A1* | 1/2018 | Odom | G06F 21/6209 |
| | | | 726/28 |
| 2018/0254990 A1 | 9/2018 | Ramaiah et al. | |
| 2019/0349392 A1 | 11/2019 | Wetterwald et al. | |
| 2020/0007566 A1* | 1/2020 | Wu | G06F 18/2411 |
| 2020/0112523 A1 | 4/2020 | Song et al. | |
| 2020/0162407 A1 | 5/2020 | Tillotson | |
| 2020/0204571 A1 | 6/2020 | Neznal et al. | |
| 2022/0006747 A1 | 1/2022 | Khandelwal et al. | |
| 2022/0345389 A1 | 10/2022 | Geng et al. | |

OTHER PUBLICATIONS

PCT International Search Report and Written Opinion, PCT Application No. PCT/US2023/014184, May 23, 2023, 10 pages.
Harkanson, R. et al. "Effects of TCP Transfer Buffers and Congestion Avoidance Algorithms on the End-to-End Throughput of TCP-over-TCP Tunnels," 16th International Conference on Information Technology—New Generations, Springer International Publishing, May 23, 2019, pp. 401-408.
PCT International Search Report and Written Opinion, PCT Application No. PCT/US2022/025843, Aug. 19, 2022, 22 pages.
PCT Invitation to Pay Additional Fees, PCT Application No. PCT/US2022/025843, Jun. 24, 2022, two pages.
European Patent Office, Extended European Search Report and Opinion, EP Patent Application No. EP 22792536.9, Jan. 27, 2025, eight pages.
Liu, S., et al. "Breaking the Transience-Equilibrium nexus: A new approach to datacenter packet transport." 18th USENIX Symposium on Networked Systems Design and Implementation (NSDI 21), 2021, Apr. 12-14, 2021, pp. 47-63.
Radhika, M., et al. "Timely: RTT-based 1-15 Congestion Control for the Datacenter", Computer Communication Review., vol. 45, No. 5, 17 Aug. 17, 2015, pp. 537-550.
Japan Patent Office, Office Action, Japanese Patent Application No. 2024-555048. Mar. 11, 2025, four pages.

* cited by examiner

CLOCK-SYNCHRONIZED EDGE-BASED NETWORK FUNCTIONS

CROSS REFERENCE TO RELATED APPLICATIONS

This application claims the benefit of U.S. Provisional Application No. 63/178,999, filed Apr. 23, 2021, and U.S. Provisional Application No. 63/320,160, filed Mar. 15, 2022, which are incorporated by reference in their entirety.

TECHNICAL FIELD

This disclosure relates generally to network transmissions and coordinated control of network traffic within data flows.

DESCRIPTION OF THE RELATED ART

Modern internet infrastructure typically includes large data centers that generate huge amounts of network traffic. When demand is high, data center output may be constrained (e.g., by a capacity of switches, gateways, and the like) and may have to meter network traffic. Such transient congestion scenarios cause bottlenecks and may cause dropped packets. To ensure that packet transmissions have succeeded in the face of such situations, systems have been developed to transmit acknowledgments from receiving nodes to sending nodes as packets are received. However, these acknowledgments are inefficient, in that they contribute to yet further network traffic. Moreover, these acknowledgments are limited to functioning in single-sender to single-receiver scenarios. Yet further, where acknowledgments are not received, packets are simply re-transmitted ad-hoc, potentially running into a same congested switch and achieving a same dropped result, resulting in scenarios where packets are perpetually delayed or even never received by their destination.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Systems and methods are disclosed herein for coordinating control of data flows in the face of transient congestion. A "netcam" monitors network traffic between clock-synchronized sender and receiver hosts that are part of a data flow. The term "netcam" as used herein, is a term that is short for "network camera," and is a module that tracks network traffic and ensures remedial action is taken where traffic of a data flow in clock-synchronized systems lags beyond tolerable limits. The netcam instructs sender and receiver hosts to buffer copies of network traffic according to some parameter (e.g., buffer a certain number of packets, buffer packets for a rolling window of time, etc.). Buffers may be overwritten on a rolling basis where the parameter is achieved (e.g., overwrite oldest packet when new packet is transmitted or received and when buffer is full). The netcam may have all sender and receiver hosts write buffer data where an anomaly is detected, and may have the sender hosts re-transmit the written packets. The re-transmission may be subject to jitter (e.g., a time delay between packet transmissions of the data flow), such that where transmission delay or failure occurred due to a given sequence of packet transmission, the jitter causes enough change to nonetheless have the re-transmission attempt succeed. The netcam may determine a need to write and re-transmit packets differently depending on a priority of a data flow.

Advantageously, the netcam implementations disclosed herein enable both improved network transmissions and forensic analysis. The improved network transmissions occur in that writing latest packet transmission attempts to buffers across all machines in a data flow enable re-transmission of an exact set of packets from many machines without reliance on acknowledgment packets that may get lost or dropped across a complex web of machines. Moreover, virtual machines may have bugs that are difficult to detect or isolate. Writing packet sequences associated with an anomaly enables failure analysis, which may enable identification of a faulty virtual machine. Further advantages and improvements are apparent from the disclosure below.

Figure 1:
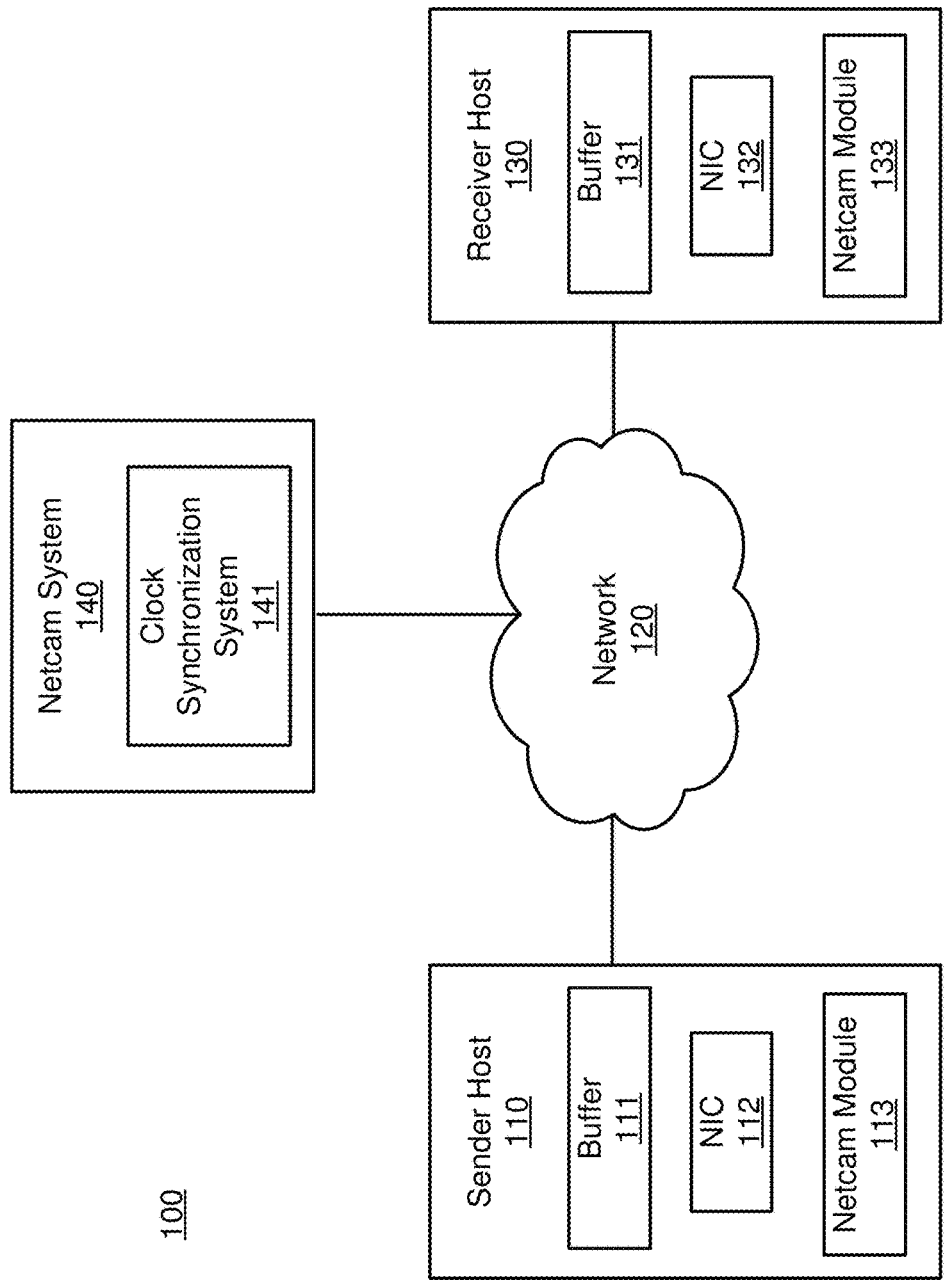
FIG. 1 is an exemplary system environment for implementing netcam and priority functions, according to an embodiment of the disclosure.

FIG. 1 is an exemplary system environment for implementing netcam and priority functions, according to an embodiment of the disclosure. As depicted in FIG. 1, netcam environment 100 includes sender host 110, network 120, receiver host 130, and clock synchronization system 140. While only one of each of sender host 110 and receiver host 130 is depicted, this is merely for convenience and ease of depiction, and any number of sender hosts and receiver hosts may be part of netcam environment 100.

Sender host 110 includes buffer 111, Network Interface Card (NIC) 112, and netcam module 113. Buffer 111 stores a copy of outbound data transmissions until one or more criteria for overwriting or discarding packets from the buffer is met. For example, the buffer may store data packets until it is at capacity, at which time the oldest buffered data packet may be discarded or overwritten. Other criteria may include a time lapse (e.g., discard packets after predetermined amount of time has elapsed from its transmission timestamp), an amount of packets buffered (e.g., after a predetermined amount of packets are buffered, begin to discard or overwrite oldest packet as new packets are transmitted), and the like.

In an embodiment, buffer 111 stores information relating to given outbound transmissions, rather than entire packets.

For example, a byte stamp may be stored rather than the packet itself, the byte stamp indicating an identifier of the packet and/or flow identifier and a time stamp at which the packet (or aggregate data flow) was sent. In such an embodiment, the stored information need not be overwritten, and may be stored to persistent memory of sender host 110 and/or clock synchronization system 140. This embodiment is not mutually exclusive to buffer 111 storing copies of packets, and they may be employed in combination.

NIC 112 may be any kind of network interface card, such as a smart NIC. NIC 112 interfaces sender host 110 and network 120.

Netcam module 113 monitors data flow for certain conditions, and triggers functionality based on the monitored data. As an example, netcam module 113 may, responsive to detecting network congestion, instruct all hosts that are part of a data flow to perform one or more of various activities, such as pausing transmissions, taking a snapshot of buffered data transmissions (that is, writing buffered data packets to persistent memory), and performing other coordinated activity. As used herein, the term data flow may refer to a collection of data transmissions between two or more hosts that are associated with one another. Further details of netcam module 113 are described in further detail with respect to FIGS. 2-8 below. Netcam module 113 may be implemented in any component of sender host 110. In an embodiment, netcam module 113 may be implemented within NIC 112. In another embodiment, netcam module 113 may be implemented within a kernel of sender host 110.

Network 120 may be any network, such as a wide area network, a local area network, the Internet, or any other conduit of data transmission between sender host 110 and receiver host 130. In some embodiments, network 120 may be within a data center housing both sender host 110 and receiver host 130. In other embodiments, network 120 may facilitate cross-data center transmissions over any distance. The mention of data centers is merely exemplary, and sender host 110 and receiver host 130 may be implemented in any medium including those that are not data centers.

Receiver host 130 includes netcam buffer 131, NIC 132, and netcam module 133. Netcam buffer 131, NIC 132, and netcam module 133 operate in similar manners to the analog components described above with respect to sender host 110. Buffer 131 may be a same size or a different size from buffer 111, and may additionally or alternatively store byte stamps for received packets. Any further distinctions between these components as implemented in sender versus receiver host will be apparent based on the disclosure of FIGS. 2-8 below.

Netcam system 140 includes clock synchronization system 141. Netcam system 140 may monitor data observed by the netcam modules implemented in hosts, such as netcam module 131 and 133. Netcam system 140 may detect conditions that require action by the netcam modules and may transmit instructions to affected netcam modules to take coordinated action for a given data flow. Clock synchronization system 141 synchronizes one or more components of each host, such as the NIC, the kernel, or any other component within which the netcam modules act. Details of clock-synchronization are described in commonly-owned U.S. Pat. No. 10,623,173, issued Apr. 14, 2020, the disclosure of which is hereby incorporated by reference herein in its entirety. Each host is synchronized to an extremely precise degree to a same reference clock, enabling precise timestamping across hosts regardless of host location, bandwidth conditions of the host, jitter, and the like. Further details of netcam system 140 are disclosed below with reference to FIGS. 2-8. Netcam system 140 is an optional component of netcam environment 100, and the netcam modules of the sender and receiver hosts can operate netcam modules without reliance on a centralized system, other than reliance on a reference clock with which to synchronize.

There are many advantages of netcam environment 100. The netcam modules are edge-based, given that they can run in the kernel or in NICs (e.g., smart NICs) of a host (e.g., physical host, virtual machine, or any other form of host). In an embodiment, the netcam functionality may run as an underlay, meaning that it may run, e.g., as a shim, on a layer of the OSI system under a congestion control layer (e.g., layer 3 of the OSI system). The netcam modules and/or netcam system 140 may instruct hosts to perform activity upon detection of a condition, such as pausing transmission of a data flow across affected hosts, taking a snapshot (that is, writing some or all of the buffered data, such as the last N bytes transmitted and/or the bytes transmitted in the last S seconds, where N or S may be default values or defined by an administrator), and any other activity disclosed herein. Further advantages and functionality are described below with respect to FIGS. 2-8.

Figure 2:
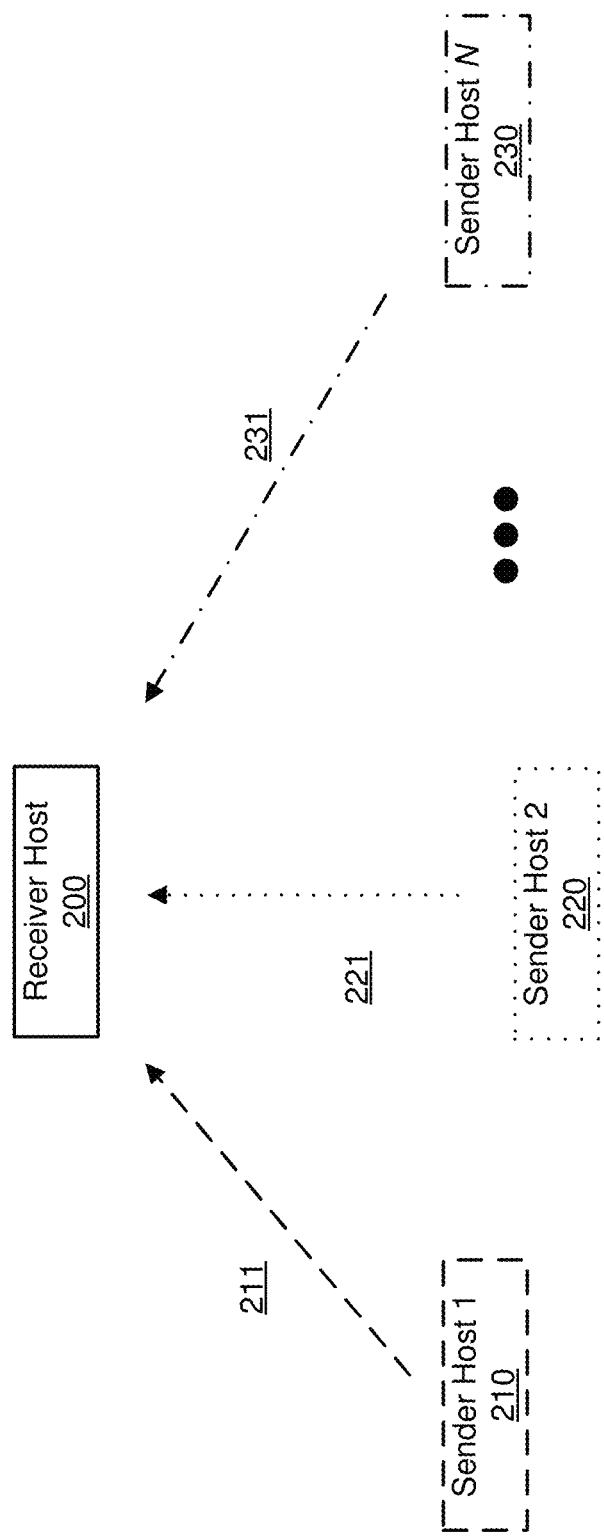
FIG. 2 is a network traffic diagram showing multiple sender hosts sending multiple data flows to a single receiver host, according to an embodiment of the disclosure.

FIG. 2 is a network traffic diagram showing multiple sender hosts sending multiple data flows to a single receiver host, according to an embodiment of the disclosure. As depicted in FIG. 2, sender host 1 is sending data flow 211 to receiver host 200, sender host 220 is sending data flow 221 to receiver host 200, and, represented by sender host 230, any number of additional hosts may be transmitting respective data flows (represented by data flow 231) to receiver host 200. As depicted in FIG. 2, each data flow sent by each sender host is different; however, this is merely for convenience two or more sender hosts may transmit data from the same data flow. Moreover, a single sender host may send two or more different data flows to receiver host 200. While only one receiver host is depicted, sender hosts may transmit data flows to any number of receiver hosts.

Figure 3:
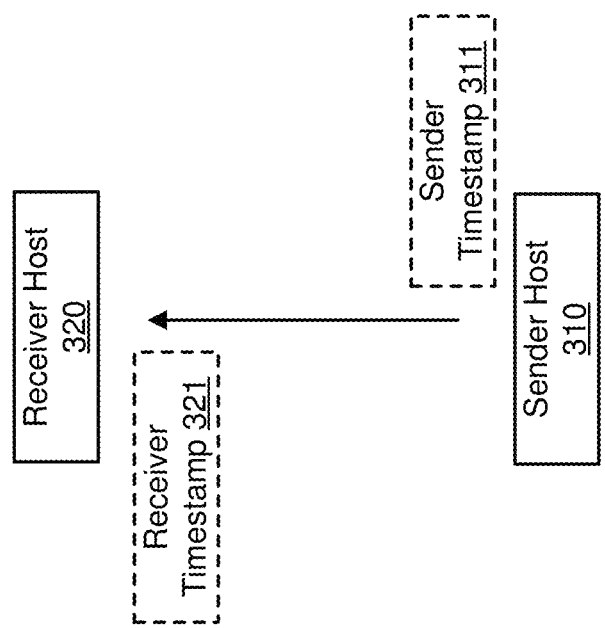
FIG. 3 is a network traffic diagram showing a timestamping operation at both a sender and receiver side of a data transmission, according to an embodiment of the disclosure.

We turn to the moment now to FIG. 3 to discuss operation of netcam modules at sender and receiver hosts. FIG. 3 is a network traffic diagram showing a timestamping operation at both a sender and receiver side of a data transmission, according to an embodiment of the disclosure. As depicted in FIG. 3, when sender host 310 transmits a packet to receiver host 320, netcam module 113 of receiver host 320 records sender timestamp 311. Similarly, when receiver host 320 receives the packet, netcam module 133 of receiver host 320 applies receiver timestamp 321. The timestamp reflects a time at which the data packet was sent or received by the relevant component on which the netcam module is installed (e.g., NIC, kernel, etc.). Sender timestamps may be stored in buffers 111 and 131, appended to packets, transmitted for storage in netcam system 140, or any combination thereof.

Because sender host 310 is synchronized to a same reference clock as receiver host 320, the elapsed time between the time of sender timestamp 311 and receiver timestamp 321 reflects a one-way delay for a given packet. In an embodiment, upon receiving a given packet, receiver host 320 transmits an acknowledgment packet to sender host 310 that indicates receiver timestamp 321, by which netcam module 113 can calculate the one-way delay by subtracting the sender timestamp 311 from the receiver timestamp 321. Other means of calculating the one-way delay are within the scope of this disclosure. For example, the sender timestamp 311 may be appended to the data transmission, and receiver host 320 may thereby calculate the one-way delay without a need for an acknowledgment packet. As yet another example, the netcam modules of sender hosts and receiver hosts may transmit, either in batches or individually, timestamps to netcam system 140, which may calculate one-way delay therefrom. For the sake of convenience and brevity, the scenario where sender host 110 calculates one-way delay based on an acknowledgment packet will be the focus of the following disclosure, though one of ordinary skill in the art would recognize that any of these means of calculation equally apply.

The netcam system then determines whether the one-way delay exceeds a threshold. For example, after calculating one-way delay, sender host 110 may compare the one-way delay to the threshold. The threshold may be predetermined or dynamically determined. Predetermined thresholds may be set by default or may be set by an administrator. As will be described further below, different thresholds may apply to different data flows depending on one or more attributes of the data flows, such as their priority. The threshold may be dynamically determined depending any number of factors, such as dynamically increasing the threshold as congestion lowers, and decreasing the threshold as congestion rises (e.g., because delay is more likely to be indicative of a problem where congestion is not a cause or is a minor cause). In one embodiment, thresholds may be set on a per-host basis, as they may depend on a distance between a sender host and a receiver host. In such an embodiment, the threshold may be a predefined multiple of a minimum one way delay between a sender and a receiver host. That is, the minimum amount of time by which a packet would need to travel from a sender host to a receiver host would be a minimum one-way delay. The multiple is typically 1.5×-3× the minimum, but may be any multiplier defined by an administrator of the netcam. The threshold is equal to the multiple times the minimum one-way delay. Responsive to determining that the one-way delay exceeds the threshold, netcam module 113 may instruct sender host 110 to take one or more actions.

These one or more actions may include pausing transmission from that sender host when one-way delay is high, which reduces congestion and thereby reduces packet drops on network 120 in general. The pause may be for a predetermined amount of time, or may be dynamically determined proportionally to the magnitude of the one-way delay. In an embodiment, the pause may be equal to the one-way delay or may be determined by applying an administrator-defined multiplier to the one-way delay. In an embodiment, the netcam determines whether a prior pause is being enforced, and if so, may reduce the pause time based on a prior amount of pause time that has already elapsed from previously acknowledged packets. Moreover, a given data flow may not be the only data flow contributing to congestion, and thus its pause duration may be smaller than the one-way delay or the one-way delay threshold.

Another action that may be taken is to write some or all buffered data packets (e.g., from either or both of the sender host and receiver host) to persistent memory responsive to the one-way delay exceeding the threshold. Diagnosis may then be performed on the buffered data packets (e.g., to identify network problems). Further actions are described with respect to FIGS. 4-8 in further detail below.

In some embodiments, data flows may be associated with different priorities. Netcam modules may determine priority of data flows either based on an explicit identifier (e.g., an identifier of a tier of traffic within a data packet header), or based on inference (e.g., based on heuristics where rules are applied to packet header and/or payload to determine priority type). Priority, as used herein, refers to a precedence scheme for which types of data packets should be allowed to be transmitted, and which should be paused, during times of congestion. The priorities disclosed herein avoid a need for underutilizing a link or making explicit allocations of bandwidth, and instead are considered in the context of choosing what packets to transmit during network congestion.

In order to prioritize high priority packets, a high one-way threshold may be assigned to high priority traffic, and a low, relative to the high one-way threshold, may be assigned to the low priority traffic. In this manner, low priority packets will have anomalies detected more frequently than high priority packets, because a lower one-way delay is required to be detected for a low priority packet for an anomaly to be detected by a netcam module, whereas high priority packets will have anomalies detected only when a higher one-way delay threshold has been breached. Following from the above discussion of determining the one-way threshold for a given host, different one-way thresholds may be applied to different data packets that are sent by or received by a same host depending on priority. In priority embodiments, the one-way threshold may be determined in the manner described above (e.g., by applying a predetermined multiplier to the threshold), where the determination is additionally influenced by applying a priority multiplier. The priority multiplier may be set by an administrator for any given type of priority, but will be higher for higher priorities, and lower for lower priorities. Priority need not be binary—any number of priority tiers may be established, each corresponding to a different type or types of data traffic, and each having a different multiplier. Priorities and their associated multipliers may change over time for given data flows (e.g., where a data flow begins transmitting a different type of data packet that does not require high latency transmission, priority may be reduced).

Additionally or alternatively to using a priority multiplier on one-way delay thresholds and differentiating one-way delay thresholds based on priority of a given packet, the netcam modules may manipulate the pause time of paused traffic during a pause operation differently depending on priority. A low pause time may be assigned to higher priority traffic, and a relatively high pause time may be assigned to lower priority traffic, ensuring that lower priority traffic is paused more often than high priority traffic during times of congestion, and thereby ensuring that higher priority traffic has more bandwidth available while the lower priority traffic is paused. The pause times may be determined in the same manner as described above, but with the additional step of applying an additional pause multiplier to the pause times, with lower pause multipliers (e.g., multipliers that are less than 1, such as 0.7×) for high priority traffic, and higher pause multipliers (e.g., multipliers that are more than 1) for lower priority traffic.

Priority may be allocated in any number of ways. In an embodiment, one or more "carpool lanes" may be allocated that can be used by data flows having qualifying priorities. For example, a "carpool lane" may be a bandwidth allocation that does not guarantee a minimum bandwidth for a given data communication, but that can only be accessed by data flows satisfying requisite parameters. Exemplary parameters may include one or more priorities that qualify to use the reserved bandwidth of a given "carpool lane." As an example, a carpool lane may require that a data flow has at least a medium priority, and thus both medium and high priorities qualify in a 3-priority system having low, medium, and high priorities. As another example, multiple carpool lanes may exist (e.g., a carpool lane that can only be accessed by high priority traffic in addition to a carpool lane that can be accessed by both medium and high priority traffic).

In an embodiment, guaranteed bandwidth may be allocated to a given priority. For example, a high priority data flow may be allocated a minimum bandwidth, such as 70 mbps. In such an embodiment, excess unused bandwidth from what is guaranteed may be allocated to lower priority data flows until such a time that the bandwidth is demanded by a data flow that qualifies for the guarantee. Guaranteed bandwidth may be absolute or relative. Relative guarantees guarantee that a given priority data flow will receive at least a certain relative amount more bandwidth than a low priority data flow. For example, a high priority data flow may be guaranteed 3× the bandwidth of a low priority data flow, and a medium priority data flow may be guaranteed 2× the bandwidth of a low priority data flow.

Returning to FIG. 2, where two or more sender hosts transmit data from a same data flow, those nodes, in tandem, and in addition to any receiver hosts that are receiving the data from the data flow, may be referred to as a "cluster." In an embodiment, a data flow may be identified by a collection of identifiers that, if all detected, represent that a data packet is part of a data flow. For example, a netcam module of any host may determine a flow identifier that identifies a data flow to which a packet belongs based on a combination of source address, destination address, source port number, destination port number, and protocol port number. Other combinations of identifiers may be used to identify a data flow to which a packet is a part. As stated before, the hosts of the cluster are all clock-synchronized against a same reference clock, no matter their form (e.g., server, virtual machine, smart NIC, etc.).

In a scenario where data flows 211 and 221 are a same data flow, sender host 210, sender host 220, and receiver host 200 form a cluster. Following this example, buffering of data packets may occur on a per-flow level across a cluster of hosts. That is, one or more netcam modules and/or netcam system 140 may record within buffers of hosts of a data flow all packets transmitted or received within whatever parameter the buffer uses to record and then overwrite data (e.g., most recently transmitted packets, packets transmitted/received within a given amount of time, etc.). In an embodiment, indicia of a timed sequence, relative to the reference clock, is stored with the buffered data (e.g., sender timestamp 311 and/or receiver timestamp 321 is stored with a buffered data packet). Thus, sender host 210 and sender host 220 may store in their buffers 111 data packets that share a given flow ID, and receiver host 200 may store received packets within buffer 131. Alternatively or additionally, transmitted and/or received packets may be transmitted to netcam system 140, which may buffer received data.

Figure 4:
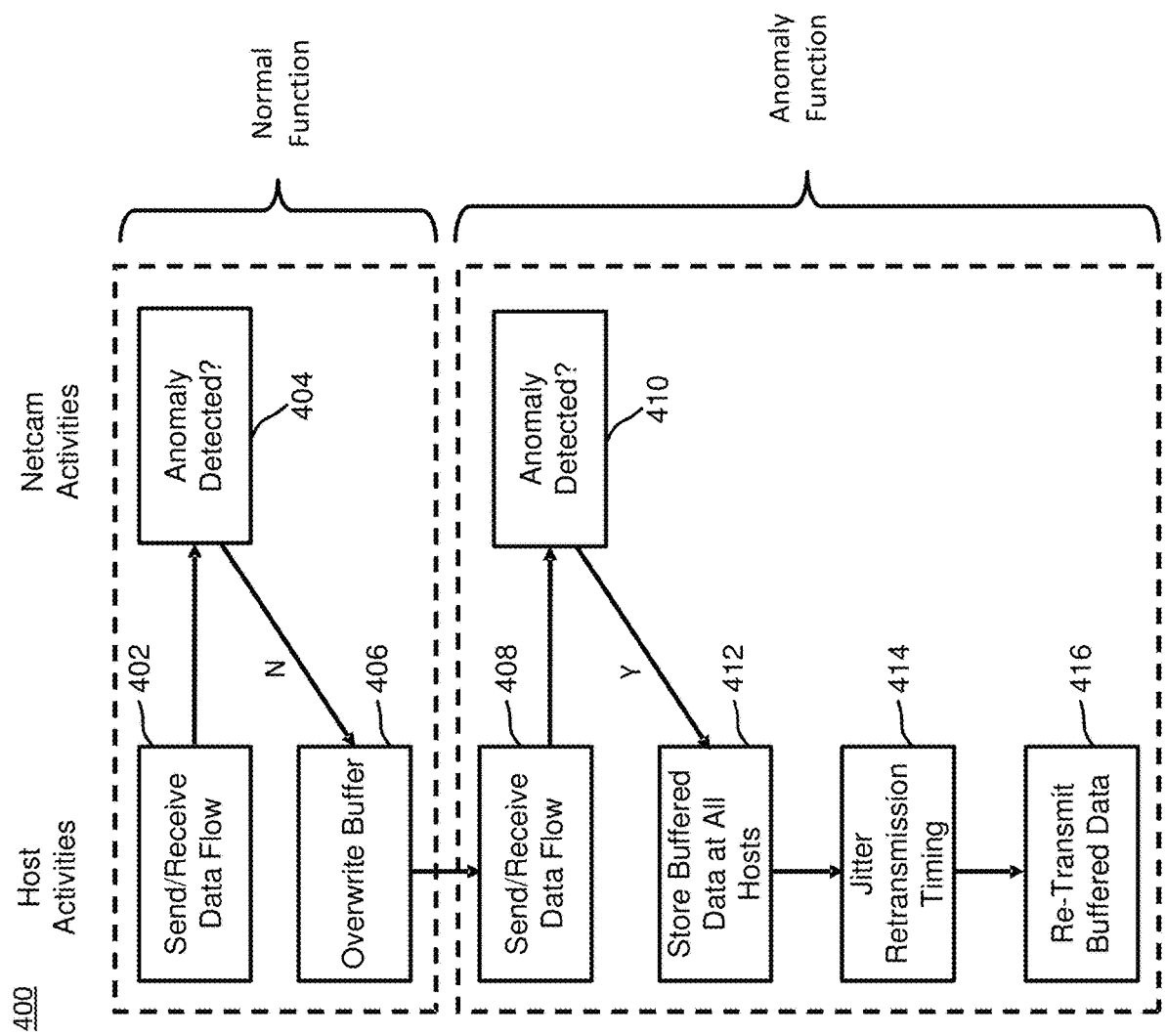
FIG. 4 is a data flow diagram showing netcam activities during normal operation and where an anomaly is detected, according to an embodiment of the disclosure.

From this vantage point of buffering a certain amount of data at each host of a cluster, different functionality of host netcam modules is possible responsive to detection of an anomaly. FIG. 4 is a data flow diagram showing netcam activities during normal operation and where an anomaly is detected, according to an embodiment of the disclosure. Data flow 400 reflects host activities and netcam activities (e.g., activities taken by netcam modules of sender/receiver hosts or netcam system 140) during normal function, and during an "anomaly function" (that is, action taken where an anomaly is detected). Data flow 400 first shows normal function, where hosts send or receive 402 data flows, and the netcam module or system (referred to generally in this figure as "netcam") determines 404 whether an anomaly is detected (e.g., based on one-way delay, as discussed above).

Where no anomaly is detected, on the assumption that the buffer is full from prior storage of data packets, the host(s) (e.g., of a cluster) overwrite 406 their buffer(s) (e.g., meaning overwrite oldest packet or follow some other overwrite heuristic as described above). Of course, where buffers are not full, overwriting is not necessary, and storing to a free memory of the buffer occurs. Normal function repeats unless an anomaly is detected.

Anomaly function occurs where an anomaly is detected. Different anomaly functions are disclosed herein, and data flow 400 focuses on illustrating a particular anomaly function of re-transmitting buffered data. Where sending/receiving 408 information of a data flow by hosts (e.g., of a cluster), the netcam may detect 410 an anomaly. As mentioned above, anomalies are detected where one-way delay exceeds a threshold. Recall that for a cluster, the threshold may vary between hosts of the cluster depending on distance between sender and receiver hosts. Responsive to detecting the anomaly, the netcam instructs 412 the buffered data to be stored at all hosts of the cluster. That is, where an anomaly occurs on even one host of a cluster, data from all nodes of the cluster is stored. This may occur by instructing the hosts to store the buffered data (or the portion thereof relating to the data flow) to persistent memory, or by keeping the buffered data within the buffer and pausing data transmissions, or a combination thereof with different instructions for different hosts. Note that where pause is used, pause time may vary across the different nodes of the cluster, as mentioned above. Regardless of how the data is stored, the netcam may jitter 414 retransmission timing. Recall that the timed sequence of packet transmissions and receptions is reflected in the stored data packets. The netcam may jitter 414 the retransmission timing by altering the timed sequence (e.g., creating longer lag between a previous time gap between transmissions, transmitting the packets in a different order, etc.). The jitter may occur according to a heuristic, or may be random. Jitter is applied in case the prior attempted timed sequence was the cause of the failure (e.g., because the prior attempted timed sequence itself may cause too much transient congestion), and thus the jitter may in such a scenario result in a success where re-transmission without jitter would fail. The netcam then re-transmits 416 the buffered data (or portion thereof). Note that it may be more expedient and computationally efficient to re-transmit the entire buffer, including data unrelated to the data flow or the anomaly, rather than isolating the packets of the data flow that relate to the anomaly. Normal function then resumes until another anomaly is detected.

Re-transmission with jitter is only one example of anomaly function, and any number of functions may occur responsive to detection of an anomaly. For example, additionally or alternatively to the anomaly function depicted in data flow 400, the buffered data may be written to persistent memory and stored for forensic analysis. In such a scenario, responsive to detecting an anomaly, the netcam may transmit an alert to an administrator and/or may generate an event log indicative of the anomaly. Any other aforementioned anomaly function is equally applicable. As an example of forensic analysis, a known type of attack on a system such as a data center is a timing attack. Timing attacks may have "signatures," in that an inter-packet spacing of traffic can be learned (e.g., by training a machine learning model using timing patterns as labeled by whether the timing pattern was a timing attack, by using pattern recognition, etc.). Forensic analysis may be performed to determine whether the data was a timing attack. Timing attacks may be blocked (e.g., by dropping data packets from a buffer upon netcam module 113 determining that the buffered data represents a timing attack).

As mentioned above, buffered data may include byte stamps (as opposed to, or in addition to, buffered packets). Byte stamps may be used in analyzing an anomaly (e.g., in forensic analysis, network debugging, security analysis, etc.). An advantage of using byte stamps, rather than buffered data packets, is that storage space is saved, and byte stamps are computationally less expensive to process. Byte stamps for an amount of time corresponding to an anomaly may be analyzed to determine a cause of the anomaly. The trade off in using byte stamps, rather than buffered packets, is that buffered packet data is more robust and may provide further insights into an anomaly.

Figure 5:
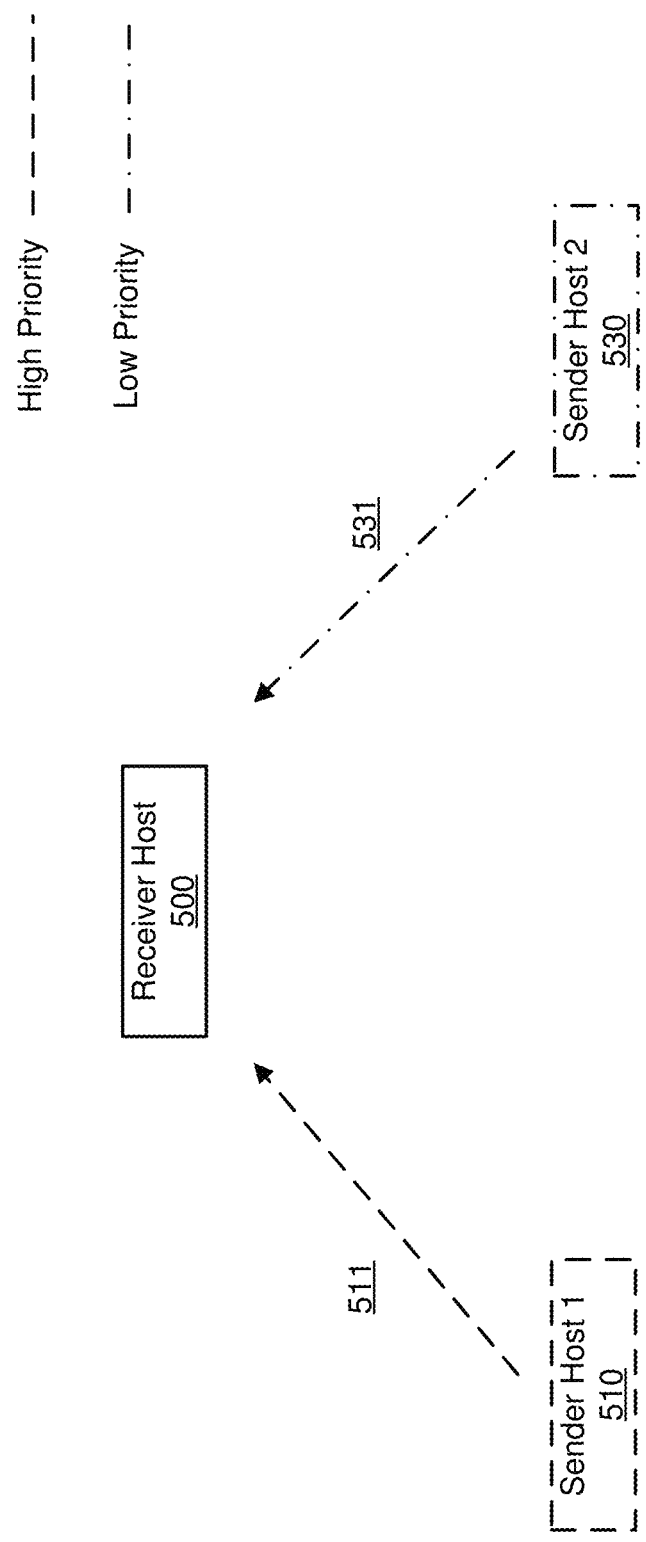
FIG. 5 is a network traffic diagram showing a receiver host receiving both high and low priority traffic from sender hosts, according to an embodiment of the disclosure.

FIG. 5 is a network traffic diagram showing a receiver host receiving both high and low priority traffic from sender hosts, according to an embodiment of the disclosure. As depicted in FIG. 5, sender host 510 transmits high priority data flow 511 to receiver host 500, and sender host 530 transmits low priority data flow 531 to receiver host 500. Where network congestion occurs and an anomaly is detected, the sender hosts may treat the high and low priority traffic differently. In an embodiment, sender host 530 detects network congestion sooner than sender host 510 because low priority data flow 531 is associated with a lower one-way delay threshold than high priority data flow 511. Therefore, sender host 530 may perform remedial action, such as pausing network transmissions of low priority data flow 531, for a pause time, while high priority data flow 511 continues to transmit because its higher one-way delay threshold has not yet been reached. Where high priority data flow 511 does reach its higher one-way delay threshold, and a pause action is responsively taken, that pause time may be lower than the pause time for low priority data flow 531, thus ensuring that high priority data flow 511 resumes sooner and during a time of less congestion than it would face if low priority data flow 531 were not paused for extra time while high priority data flow 511 continued.

While depicted as two separate sender hosts, sender hosts 510 and 530 may be a same host, where one sender host transmits both high and low priority traffic to receiver host 500. Thus, a same sender host may take remedial action (e.g., pause) responsive to detecting an anomaly of low priority data flow 531 while continuing to transmit high priority data flow 511 as normal. Sender hosts may have multiple buffers 111, each buffer corresponding to a different priority of data.

Figure 6:
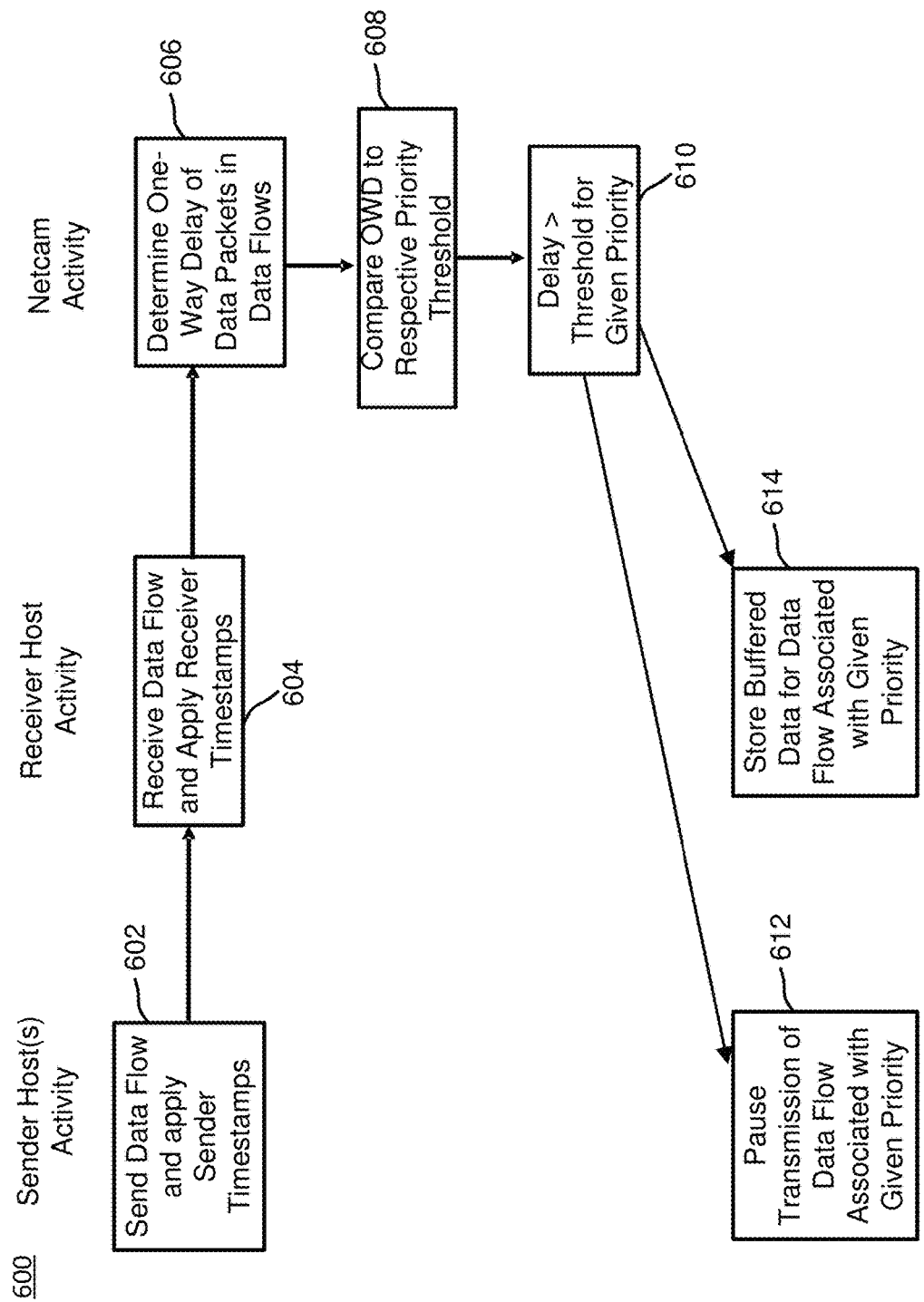
FIG. 6 is a data flow diagram showing netcam activities where priorities are accounted for in determining netcam activity, according to an embodiment of the disclosure.

FIG. 6 is a data flow diagram showing netcam activities where priorities are accounted for in determining netcam activity, according to an embodiment of the disclosure. Data flow 600 begins with one or more sender hosts (e.g., sender host 110) sending 602 a data flow and applying sender timestamps (e.g., sender timestamp 311). A receiver host (e.g., receiver host 130) receives 604 the data flow and applies receiver timestamps (e.g., receiver timestamp 321). Netcam activity then occurs. As described above, the netcam activity may occur at the sender host(s) (e.g., by receiving ACK packets indicating receiver timestamps and using netcam modules to compute one-way delay), at receiver hosts (e.g., where sender timestamps are included in the data flow and netcam modules compute one-way delay therefrom), at netcam system 140, or some combination thereof.

The netcam determines 606 one-way delay of data packets in data flows. As explained above, the one-way delay computation may depend on a priority of the data flow, and thus different data flows may have different one-way delay thresholds ("priority thresholds"). The netcam compares 608 the determined one-way delay to the respective priority threshold. Responsive to determining 610 that the one-way delay is greater than the threshold for a given priority data flow, anomaly function is initiated. As depicted in FIG. 6, some anomaly function may include one or more of pausing 612 transmission of the data flow associated with the given priority and/or storing 614 the buffered data flow associated with the given priority (e.g., for forensic analysis). As described above, the pause time may vary depending on the priority level of the paused data flow.

Figure 7:
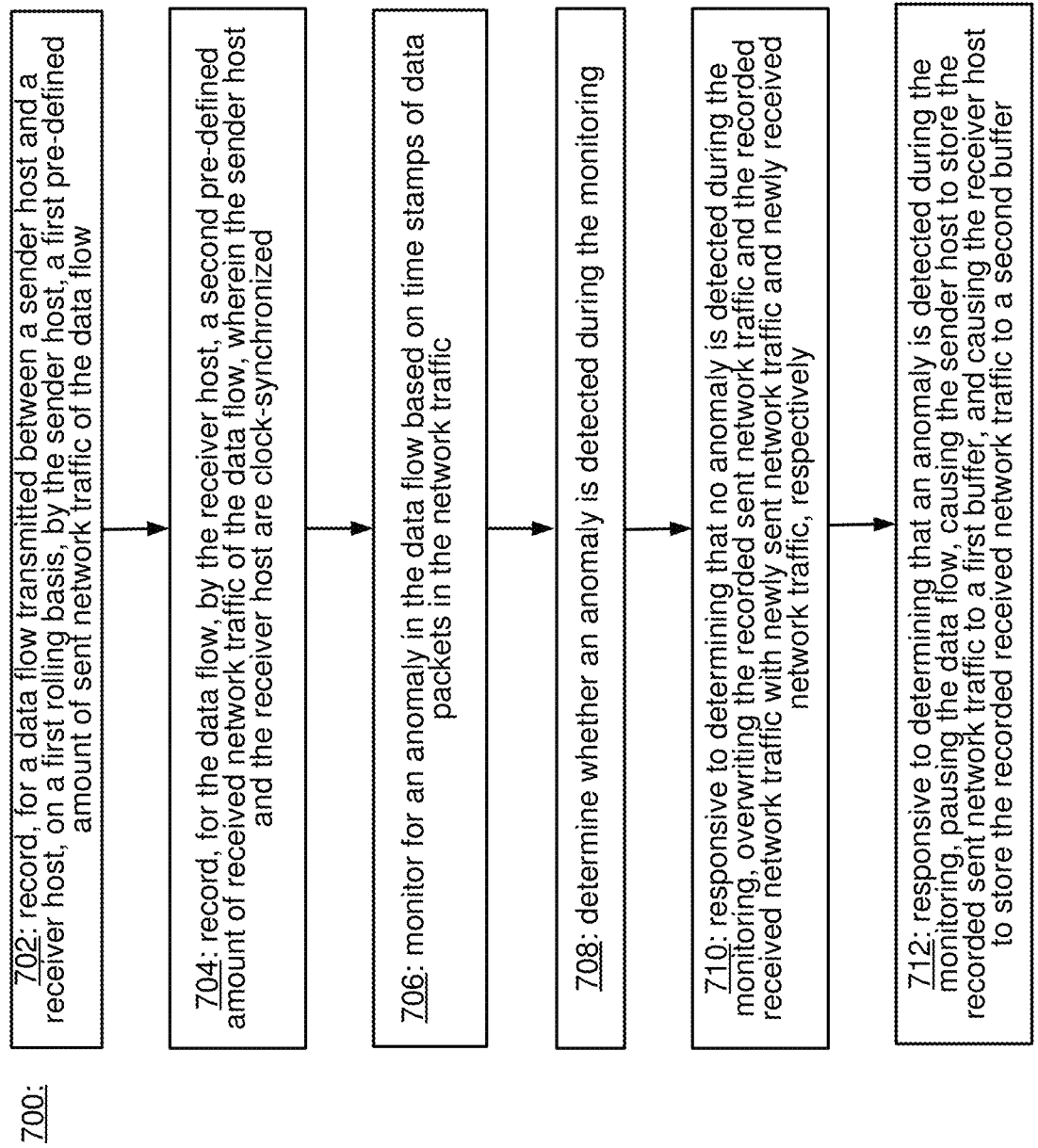
FIG. 7 is a flowchart that illustrates an exemplary process for performing netcam activities, according to an embodiment of the disclosure.

FIG. 7 is a flowchart that illustrates an exemplary process for performing netcam activities, according to an embodiment of the disclosure. Process 700 may be executed by one or more processors (e.g., based on computer-readable instructions to perform the operations stored in a non-transitory computer-readable memory). For example, netcam modules 113, 133, and/or netcam system 140 may execute some or all of the instructions to perform process 700. Process 700 is described with respect to netcam module 113 for convenience, but may be executed by any other netcam module and/or system.

Process 700 begins with, for a data flow transmitted between a sender host (e.g., sender host 110) and a receiver host (e.g., receiver host 130), recording 702, on a first rolling basis, by the sender host, a first pre-defined amount of sent network traffic of the data flow (e.g., recording to buffer 111) and recording 704, on a second rolling basis, by the receiver host, a second pre-defined amount of received network traffic of the data flow (e.g., recording to buffer 131), wherein the sender host and the receiver host are clock-synchronized (e.g., using a reference clock of clock synchronization system 141.

Netcam module 113 monitors 706 for an anomaly in the data flow based on time stamps of data packets in the network traffic (e.g., by subtracting sender timestamp 311 from receiver timestamp 321 and comparing the result to a one-way delay threshold). Netcam module 113 determines 708 whether an anomaly is detected during the monitoring (e.g., based on whether the comparison shows the one-way delay to be greater than the threshold). Responsive to determining that no anomaly is detected during the monitoring, netcam module 133 may passively allow an overwriting 710 of the recorded sent network traffic and the recorded received network traffic with newly sent network traffic and newly received network traffic, respectively (e.g., recording the latest network traffic over the oldest recorded data packet(s) and going on to repeat elements 702-708). Responsive to determining that an anomaly is detected during the monitoring, netcam module 113 pauses 712 the data flow, causes the sender host to store the recorded sent network traffic to a first buffer, and causes the receiver host to store the recorded received network traffic to a second buffer.

Figure 8:
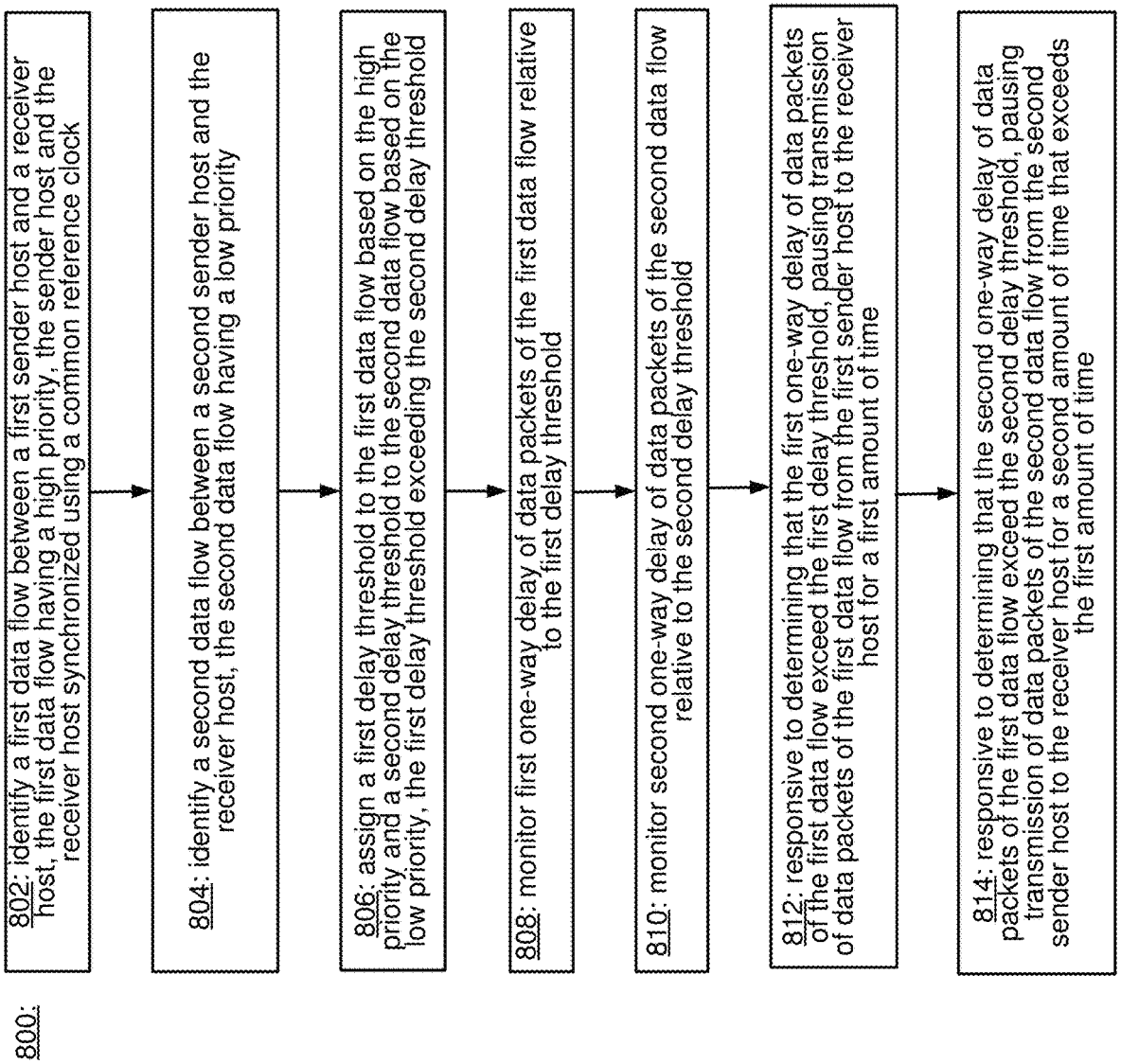
FIG. 8 is a flowchart that illustrates an exemplary process for performing netcam activities in a multiple priority scenario, according to an embodiment of the disclosure.

FIG. 8 is a flowchart that illustrates an exemplary process for performing netcam activities in a multiple priority scenario, according to an embodiment of the disclosure. Process 800 may be executed by one or more processors (e.g., based on computer-readable instructions to perform the operations stored in a non-transitory computer-readable memory). For example, netcam modules 113, 133, and/or netcam system 140 may execute some or all of the instructions to perform process 800. Process 800 is described with respect to netcam module 113 for convenience, but may be executed by any other netcam module and/or system.

Process 800 begins with netcam module 113 identifying 802 a first data flow between a first sender host (e.g., sender host 110) and a receiver host (e.g., receiver host 130), the first data flow having a high priority (e.g., high priority data flow 511), the sender host and the receiver host synchronized using a common reference clock. Netcam module 113 (e.g., of a different sender host or a same sender host as sender host 110) identifies 804 a second data flow between a second sender host and the receiver host (e.g., low priority data flow 531), the second data flow having a low priority, where the second sender host may be the same or a different host as the first sender host.

Netcam module 113 assigns 806 a first delay threshold to the first data flow based on the high priority and a second delay threshold to the second data flow based on the low priority, the first delay threshold exceeding the second delay threshold. Netcam module 113 monitors 808 first one-way delay of data packets of the first data flow relative to the first delay threshold, and monitors 810 second one-way delay of data packets of the second data flow relative to the second delay threshold. Responsive to determining that the first one-way delay of data packets of the first data flow exceed the first delay threshold, netcam module 113 pauses 812 transmission of data packets of the first data flow from the first sender host to the receiver host for a first amount of time. Responsive to determining that the second one-way delay of data packets of the first data flow exceed the second delay threshold, netcam module 113 pauses 814 transmission of data packets of the second data flow from the second sender host to the receiver host for a second amount of time that exceeds the first amount of time.

What is claimed is:

1. A computer-implemented method for monitoring for anomalies in network traffic, the method comprising:
    for a data flow transmitted between a sender host and a receiver host:
        recording, on a first rolling basis, by the sender host, a first pre-defined amount of sent network traffic of the data flow;
        recording, on a second rolling basis, by the receiver host, a second pre-defined amount of received network traffic of the data flow, wherein the sender host and the receiver host are clock-synchronized;
    monitoring for an anomaly in the data flow based on time stamps of data packets in the network traffic;
    determining whether an anomaly is detected during the monitoring;
    responsive to determining that no anomaly is detected during the monitoring, overwriting the recorded sent network traffic and the recorded received network traffic with newly sent network traffic and newly received network traffic, respectively; and
    responsive to determining that an anomaly is detected during the monitoring, pausing the data flow, causing the sender host to store the recorded sent network traffic to a first buffer, and causing the receiver host to store the recorded received network traffic to a second buffer, wherein determining that the anomaly is detected during the monitoring comprises determining that a one-way delay of a data packet sent by the sender host to the receiver host exceeds a threshold amount of delay, wherein the one-way delay is determined using a send time stamp applied by the sender host to data packets of the data flow as compared to a receive time stamp applied by the receiver host to the data packets, wherein the sender host and the receiver host are synchronized to a same reference clock, and wherein the send time stamp and the receive time stamp are based on the same reference clock.

2. The computer-implemented method of claim 1, wherein the first pre-defined amount of sent network traffic and the second pre-defined amount of received network traffic are a same amount.

3. The computer-implemented method of claim 2, wherein the same amount is measured using either a pre-defined number of most recently transmitted or received packets, or packets received during a pre-defined amount of units of time prior to a current time.

4. The computer-implemented method of claim 1, wherein the sender host is located at either a kernel or a network interface card (NIC) of a sender device, and wherein the receiver host is located at either a kernel or a NIC of a receiver device.

5. The computer-implemented method of claim 4, wherein the sender device is a physical machine or a virtual machine, and wherein the receiver device is a physical machine or a virtual machine.

6. The computer-implemented method of claim 1, wherein the data flow includes data packets from a plurality of sender hosts, the plurality including the sender host, and wherein each of the plurality of sender hosts records the data packets it sends as part of the data flow.

7. The computer-implemented method of claim 6, wherein, responsive to determining that the anomaly is detected during the monitoring, causing each of the plurality of sender hosts to store their respective recorded data packets sent as part of the data flow to respective buffers.

8. The computer-implemented method of claim 7, further comprising, further responsive to determining that the anomaly is detected during the monitoring, retransmitting data packets associated with the anomaly from each sending host's respective buffer, and resuming the data flow.

9. The computer-implemented method of claim 8, wherein retransmitting the data packets comprises jittering a transmission time of two or more of the data packets at the sender host to the receiver host, wherein jittering is done using one or more of predefined amounts of time or random amounts of time.

10. The computer-implemented method of claim 8, wherein retransmitting the data packets comprises re-transmitting all of the data packets from each sending host's respective buffer.

11. A non-transitory computer-readable medium comprising memory with instructions encoded thereon for monitoring for anomalies in network traffic, the instructions, when executed by one or more processors, comprising instructions to: for a data flow transmitted between a sender host and a receiver host: record, on a first rolling basis, by the sender host, a first pre-defined amount of sent network traffic of the data flow; and record, on a second rolling basis, by the receiver host, a second pre-defined amount of received network traffic of the data flow, wherein the sender host and the receiver host are clock-synchronized; monitor for an anomaly in the data flow based on time stamps of data packets in the network traffic; determine whether an anomaly is detected during the monitoring; responsive to determining that no anomaly is detected during the monitoring, overwrite the recorded sent network traffic and the recorded received network traffic with newly sent network traffic and newly received network traffic, respectively; and responsive to determining that an anomaly is detected during the monitoring, pause the data flow, causing the sender host to store the recorded sent network traffic to a first buffer, and causing the receiver host to store the recorded received network traffic to a second buffer, wherein determining that the anomaly is detected during the monitoring comprises determining that a one-way delay of a data packet sent by the sender host to the receiver host exceeds a threshold amount of delay, wherein the one-way delay is determined using a send time stamp applied by the sender host to data packets of the data flow as compared to a receive time stamp applied by the receiver host to the data packets, wherein the sender host and the receiver host are synchronized to a same reference clock, and wherein the send time stamp and the receive time stamp are based on the same reference clock.

12. The non-transitory computer-readable medium of claim 11, wherein the first pre-defined amount of sent network traffic and the second pre-defined amount of received network traffic are a same amount.

13. The non-transitory computer-readable medium of claim 12, wherein the same amount is measured using either a pre-defined number of most recently transmitted or received packets, or packets received during a pre-defined amount of units of time prior to a current time.

14. The non-transitory computer-readable medium of claim 11, wherein the sender host is located at either a kernel or a network interface card (NIC) of a sender device, and wherein the receiver host is located at either a kernel or a NIC of a receiver device.

15. The non-transitory computer-readable medium of claim 14, wherein the sender device is a physical machine or a virtual machine, and wherein the receiver device is a physical machine or a virtual machine.

16. The non-transitory computer-readable medium of claim 11, wherein the data flow includes data packets from a plurality of sender hosts, the plurality including the sender host, and wherein each of the plurality of sender hosts records the data packets it sends as part of the data flow.

17. The non-transitory computer-readable medium of claim 11, wherein byte stamps are recorded for the data flow in persistent memory.

* * * * *